Aug. 31, 1965   A. W. ADLER   3,203,114
SYSTEM FOR DEMONSTRATING ELECTRICAL SCIENCE
Filed Oct. 19, 1962   7 Sheets-Sheet 1
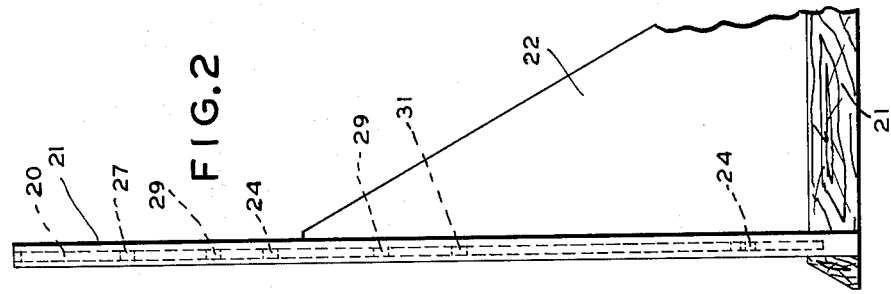
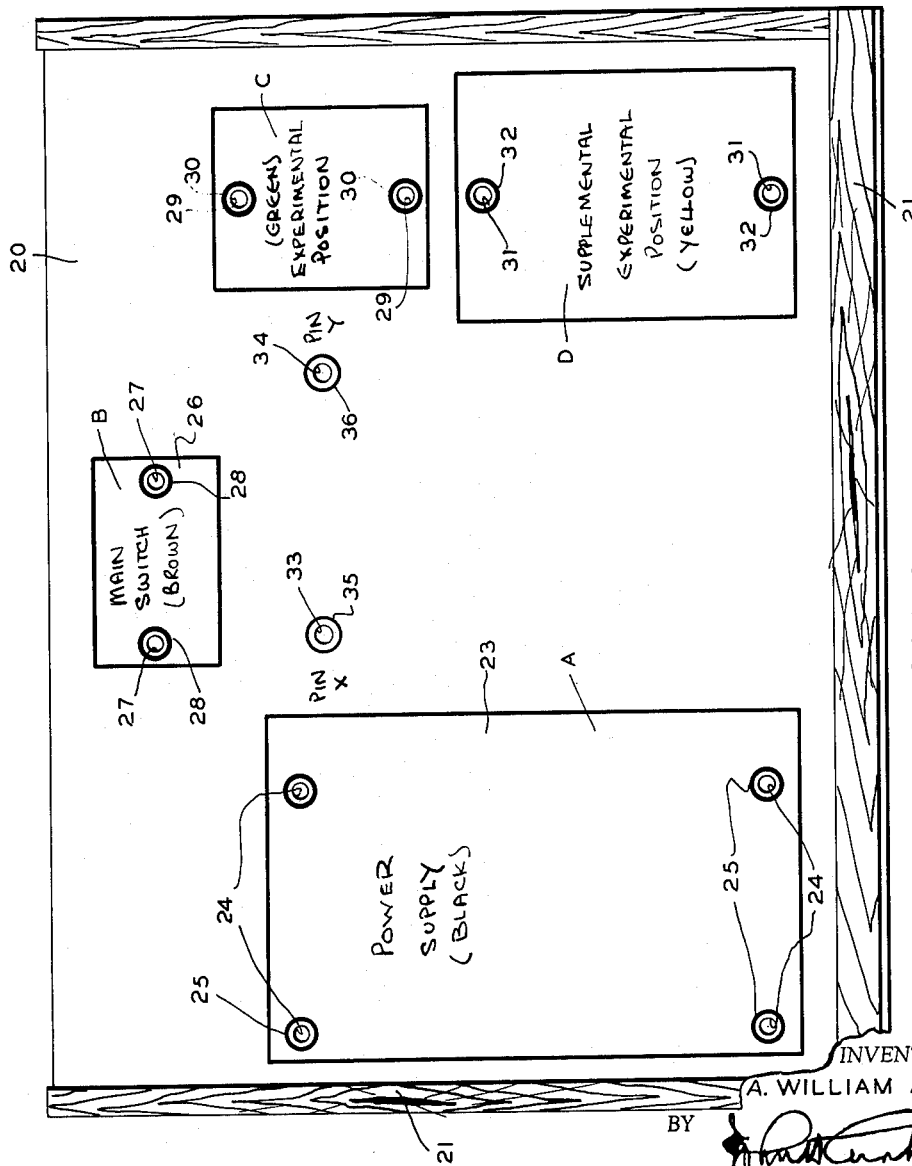
INVENTOR.
A. WILLIAM ADLER
BY
AGENT Aug. 31, 1965  A. W. ADLER  3,203,114
SYSTEM FOR DEMONSTRATING ELECTRICAL SCIENCE
Filed Oct. 19, 1962  7 Sheets-Sheet 2
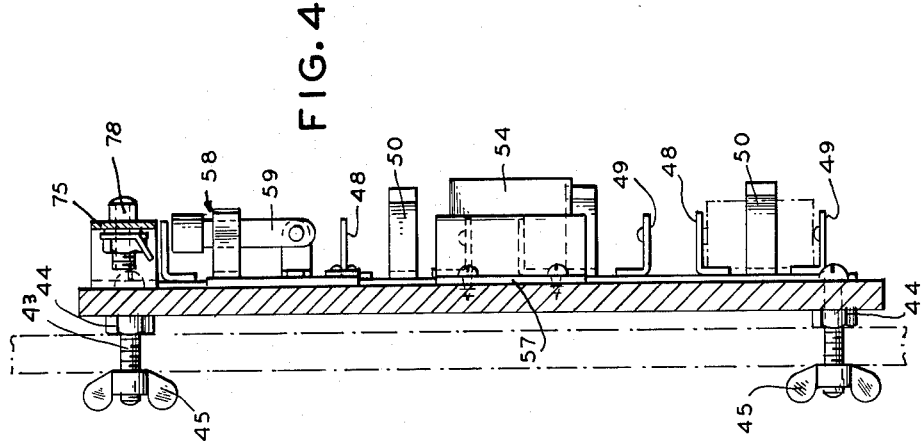
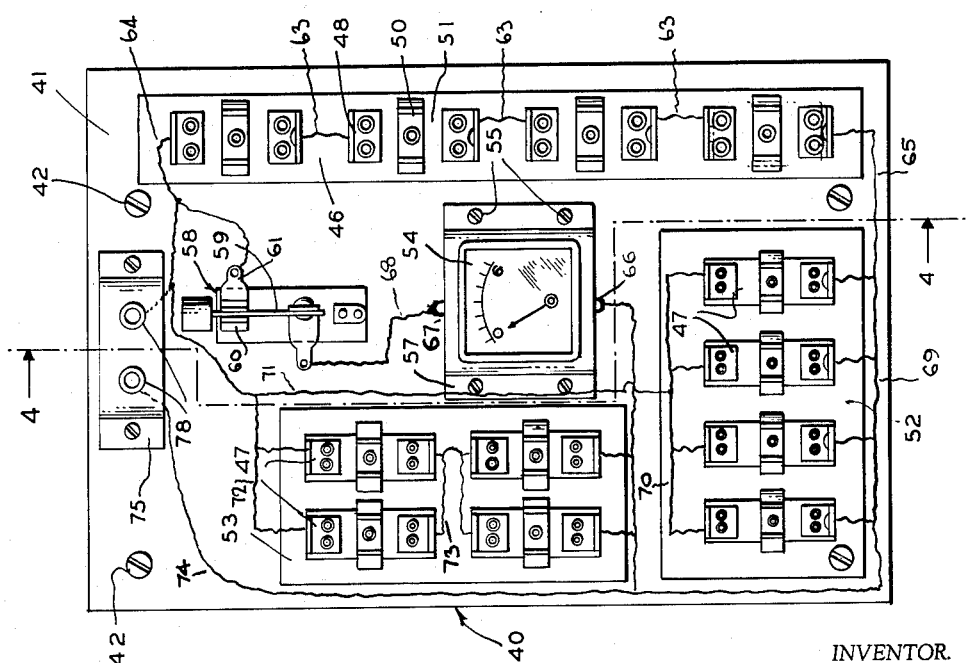
INVENTOR.
A. WILLIAM ADLER
BY
AGENT Aug. 31, 1965  A. W. ADLER  3,203,114
SYSTEM FOR DEMONSTRATING ELECTRICAL SCIENCE
Filed Oct. 19, 1962  7 Sheets-Sheet 3

INVENTOR.
A. WILLIAM ADLER

BY

AGENT

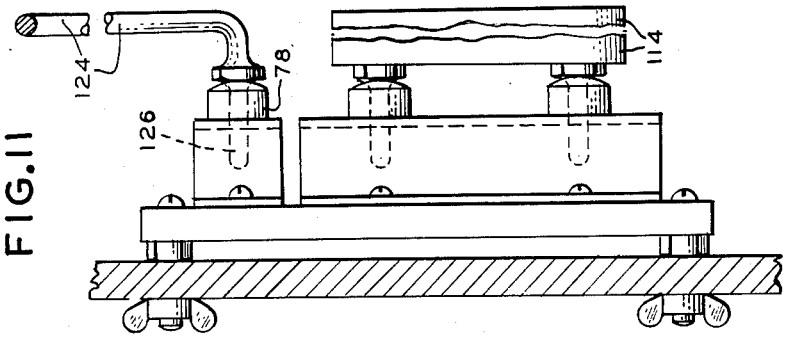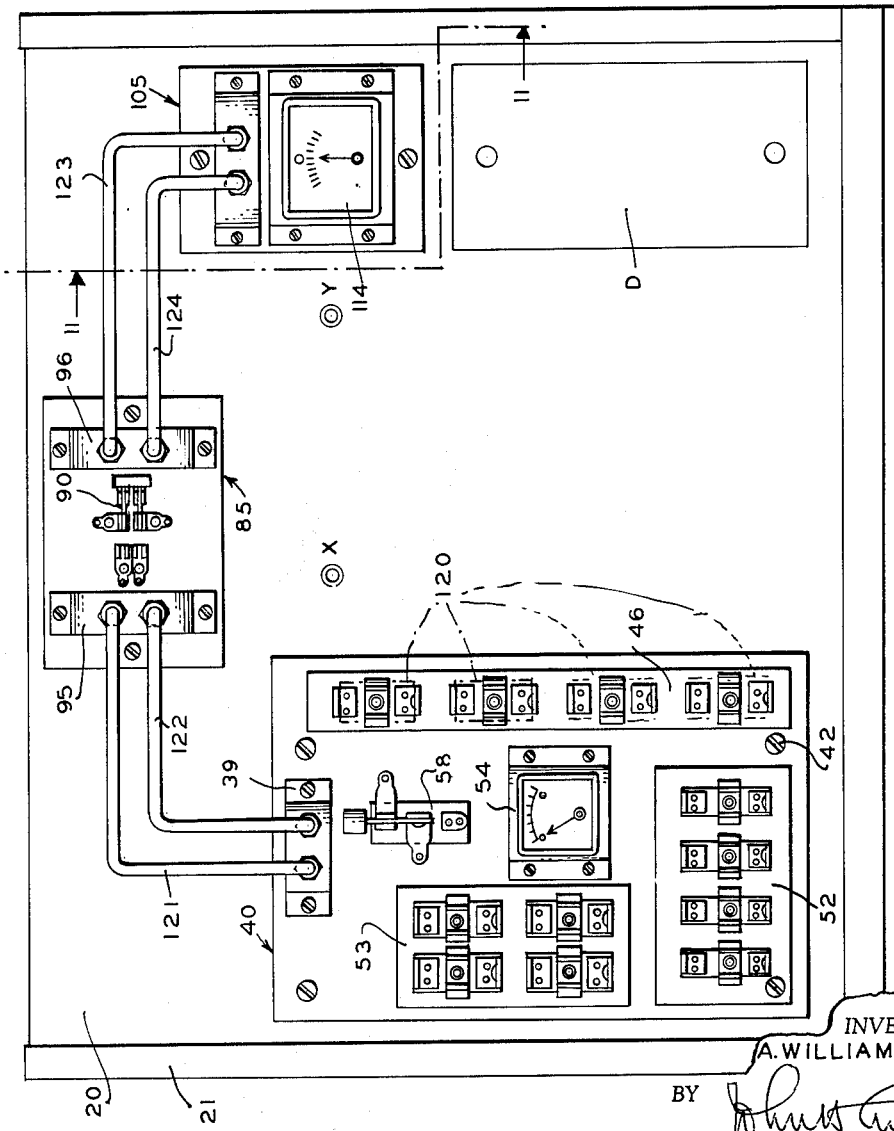

Aug. 31, 1965  A. W. ADLER  3,203,114
SYSTEM FOR DEMONSTRATING ELECTRICAL SCIENCE
Filed Oct. 19, 1962  7 Sheets-Sheet 5
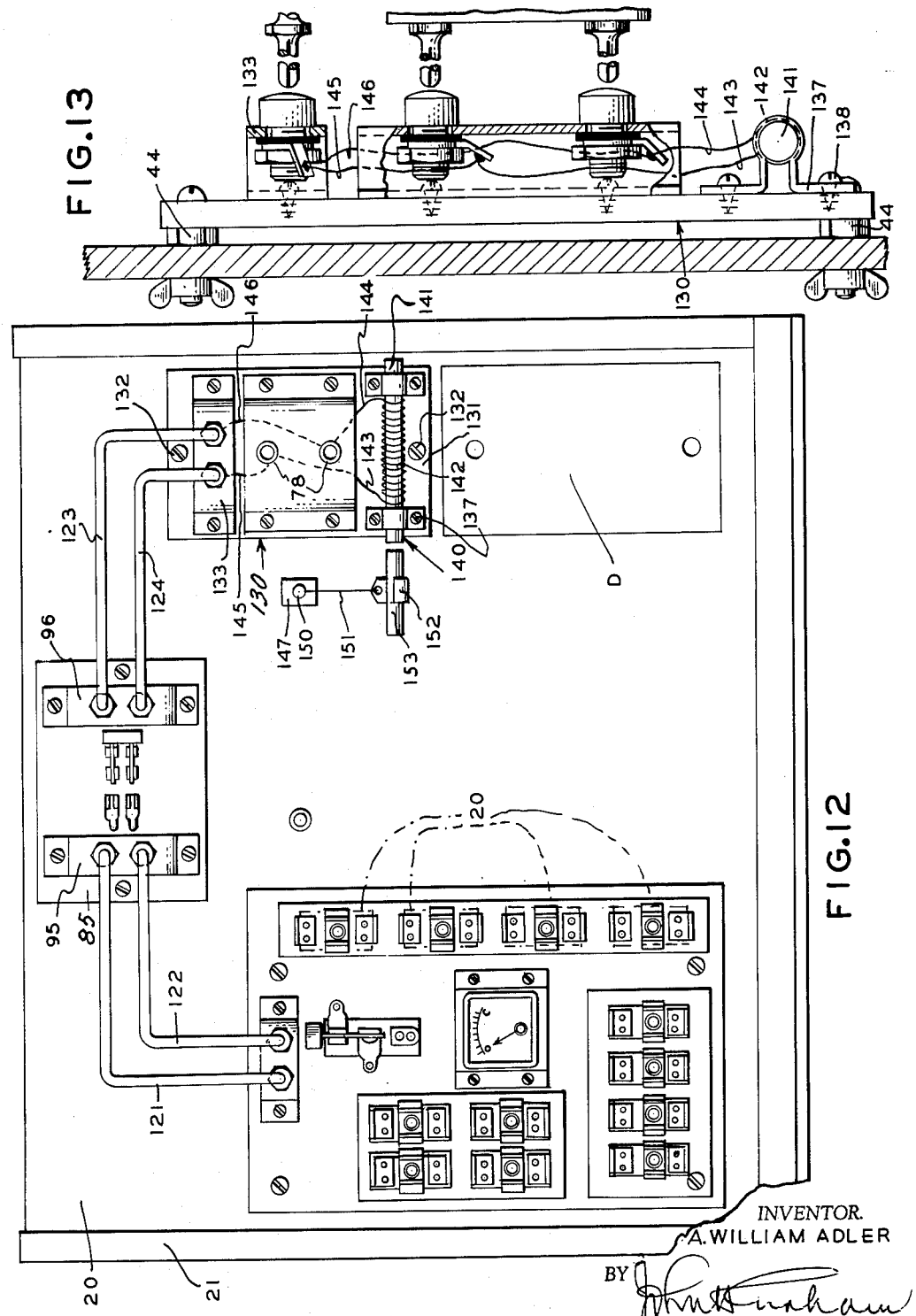
INVENTOR.
A. WILLIAM ADLER
BY 
AGENT Aug. 31, 1965  A. W. ADLER  3,203,114
SYSTEM FOR DEMONSTRATING ELECTRICAL SCIENCE
Filed Oct. 19, 1962  7 Sheets-Sheet 6

INVENTOR.
A. WILLIAM ADLER
AGENT

Aug. 31, 1965 A. W. ADLER 3,203,114
SYSTEM FOR DEMONSTRATING ELECTRICAL SCIENCE
Filed Oct. 19, 1962 7 Sheets-Sheet 7
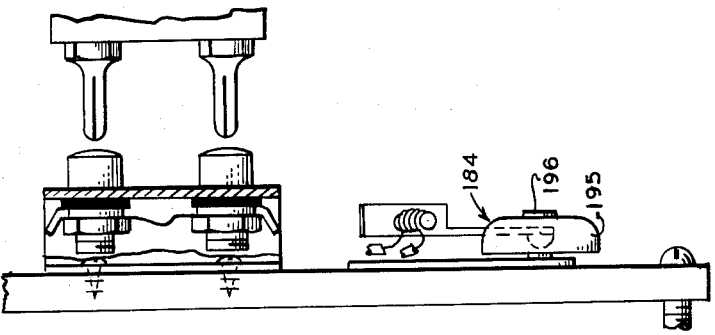
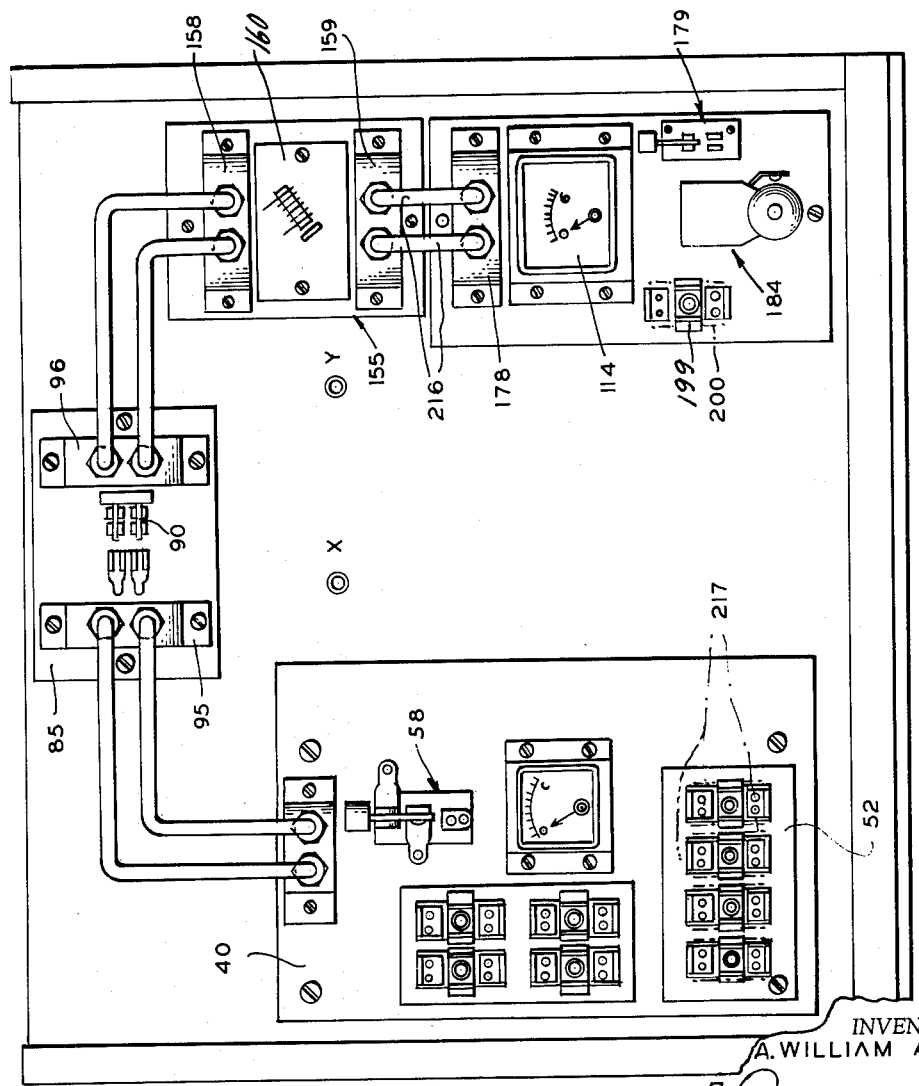
INVENTOR.
A. WILLIAM ADLER
BY
AGENT United States Patent Office 3,203,114
Patented Aug. 31, 1965

3,203,114
SYSTEM FOR DEMONSTRATING ELECTRICAL
SCIENCE
Alfred William Adler, 5 Belgrade Terrace,
West Orange, N.J.
Filed Oct. 19, 1962, Ser. No. 231,751
4 Claims. (Cl. 35—19)

The present invention relates to methods and means for demonstrating electrical science by suitable conventional experiments and is more concerned with a new and improved system for demonstrating electrical science.

In the past, when a series of electrical experiments are to be performed to demonstrate well known and accepted rules and phenomena governing electrical science, it has been necessary for the demonstrator to assemble a number of groups of apparatus and wire the respective elements into completed circuits or units which are independently shown and operated. This calls for utilizing duplicate parts for some elements of the units. Power packs to deliver different desired voltages, either D.C. or A.C., are known but if, for instance, a voltmeter is needed in more than one circuit used successively in the demonstration, some disconnection and rewiring of the voltmeter is needed or complex switching is required. This consumes valuable time which the demonstrator can otherwise use and, due to such time factor, may result in an error of wiring with the consequent disconcerting failure of the experiment.

Perhaps the most important factor, however, when utilizing duplicate parts in several experimental circuit units or when using rewiring techniques from unit to unit is that since such demonstrations are, for the most part, given by educators for passing knowledge to interested observers, is an essential loss of continuity and coordination in the observer's mind. If, for example, the same power pack, such as a 6-volt battery, is used for two successive experiments, the student will associate the function of the power source with the two experiments, in common. If however, in each successive experiment a voltmeter is either duplicated or is rewired in one after the other, the mental image of coordination of the circuits may not be fully appreciated.

The present invention is predicated on the basic theory that by showing repeated experiments with the units of common function rapidly interchangeable, a better mental appreciation of the overall functions of the science will be conveyed than by the prior principles outlined with an increase in learning and comprehension on the part of the observer or student. The object of the invention is to provide a system for demonstrating electrical science which will achieve this purpose.

As a secondary, but exceedingly important object, the present invention contemplates making it possible for the demonstrator to change his circuitry at will with complete confidence in correct wiring of the circuits and at rates of speed which are substantially immediate.

Another object of the invention is to provide an assembly of parts for demonstrating electrical science which can be attached and dismantled very quickly, which is easily packed and carried and which is fool-proof in correct arrangement of parts for the selected experiments.

As a further object, the present invention provides a simple, easy to understand system of showing electrical fundamentals in a clear, concise form of visual aid.

Generally, in practicing the present invention, an electrical science demonstration system is provided which essentially has a display board which can be placed upright in a visual position to be observed by one or more spectators and upon which can be supported a number of pre-wired electrical units. The units can be assembled in single form for individual demonstration of the internally wired circuit of each unit and can also be wired together, at will, to form other circuits in tandem. By arrangement, in accordance with an important feature of the present invention, the basic connectors to associating a plurality of such units together on the board are pre-formed, rigid and shaped so that only one form or array of connection is permitted. To give versatility to the system and to keep the number of units to a low limit to be practical, means are provided to cut into the several circuits of the units, suitable meters, such as an ammeter, which serves the several purposes required. The ammeter used may be a center reading null meter, so that not only can the current be measured as to quantity but also as to polarity.

The system of the present invention is very versatile and can be used in various ways for demonstrating and testing many circuits. The basic units are a power supply unit which has provision for series, parallel and series-parallel arrangement of batteries, to give a variety of supplies of D.C. power and a main switch unit which can be associated with the power supply unit to control its output in either direction, i.e. reversal of polarity is available, at will. A number of main experimental units are provided which can be associated with the power supply unit and the main switch unit, these including an ammeter base unit for measuring the amperage, together with an ammeter therefore having a central null point, to show reversal of polarity; a relay unit; an electromagnetic unit; electrical motor units of various pole formations; and similar units which can be driven and controlled by the power supply unit through the main switch unit. In a supplementary experimental position on the board there may be associated an electric bell unit which can be separately used by its internal circuitry and thereafter controlled through the relay unit; a series-parallel lamp base, which can be used with the ammeter base to show the effects of voltage on electric lamps in various circuit arrangements; and like units for secondary or associated use. The size and layout on the board of the power supply unit, the main switch unit, all main experimental units and all supplementary experimental units are so varied and preferably color-coded, that they can only assume the place on the board pre-arranged for them. As mentioned previously, all main bar connectors for the units are arranged for only one manner of attachment so that the units can only be in the positions designated and can only be connected in the correct way.

Thus, the system provides a safe, simple association of parts which is readily portable, quickly and easily assembled, and dismantled, is free of wrong wiring connections, is pre-arranged as to units to be used for demonstration and is unique in its manner of presentation of electrical science experiments.

The present invention, in brief compass, provides an electrical science demonstration system comprising a display board having a plurality of areas of different size marked as frames upon the board, each area having holes through said board arranged at preselected positions; a power supply unit formed of a base having a plurality of battery clips fast thereon, a voltmeter mounted thereon and a single pole single throw switch for the voltmeter, said unit being wired for parallel, series and series-parallel connections to said switch and voltmeter and to an outlet strip having two sockets. The base is provided with pins to match holes in one frame on said display board. A main switch unit is provided comprising a base, a double throw double pole reversing switch mounted thereon, with an inlet strip with two sockets and an outlet strip with two sockets, said switch unit being wired to cause reverse polarity at said outlet strip with said switch when operated in its two directions of throw. Preformed rigid connector bars shaped only to connect said outlet strip sockets of said power supply unit to said input strip sockets of said main switch unit are used. With said major units of a power supply unit and a main switch unit there can be used on other areas of said board, units for demonstration of the theory of electrical energy and its use by associating units having bases to fit on said display board by pins passing through said board and located within said frames, with rigid connecting bars preshaped to pass only from the outlet strip of said main switch to the inlet strip of another unit. By this means, desired D.C. current will be supplied at the inlet strip to the other experimental unit or units depending on the series or parallel connections of the power supply and the polarity will be determined by position of throw of the main switch unit.

The frames or areas on the display board can be marked with indicia for the units and/or can be color-coded to suit.

Other modifications and details will be hereinafter set forth in the specific description relative to the accompanying drawings.

Reference will now be made to the accompanying drawings, the figures of which illustrate means for providing the system of the present invention, and in which:

FIGURE 1 is an elevational view of the basic support display board for use in the present invention;

FIGURE 2 is an elevational side view of the board of FIG. 1;

FIGURE 3 is an elevational view of a major assembled unit for the system of the present invention, viz, the power supply;

FIGURE 4 is a side view of the power supply unit of FIG. 3;

FIGURE 10 is an elevational view of the board of FIG. 1 having assembled thereon, in operative condition the power supply unit of FIG. 3, the main switch unit of FIG. 5 and the main auxiliary unit of FIG. 7;

FIGURE 11 is a fragmentary side view of part of the board assembly of FIG. 10 showing particularly the main auxiliary unit of FIG. 7 in operative position and carrying an ammeter as shown in FIG. 8 but plugged into operating position on the board;

FIGURE 12 is an elevational view of the board of FIG. 1 having assembled thereon the power supply unit of FIG. 3 and the main switch unit of FIG. 5 showing the main parts thereof together with a first experimental unit assembled in operative position for demonstrating electromagnet forces, i.e. the electromagnet unit;

FIGURE 13 is a side view of the electromagnet unit of FIG. 12 showing its construction and ability to operate together with a permanent magnet shown suspended in correct position from a pin on the board of FIG. 1;

Figure 5:
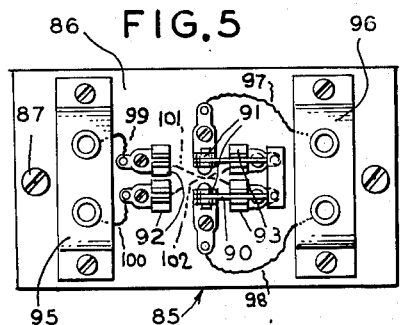
FIGURE 5 is an elevational view of the main switch assembled unit for the system of the present invention.
Figure 14:
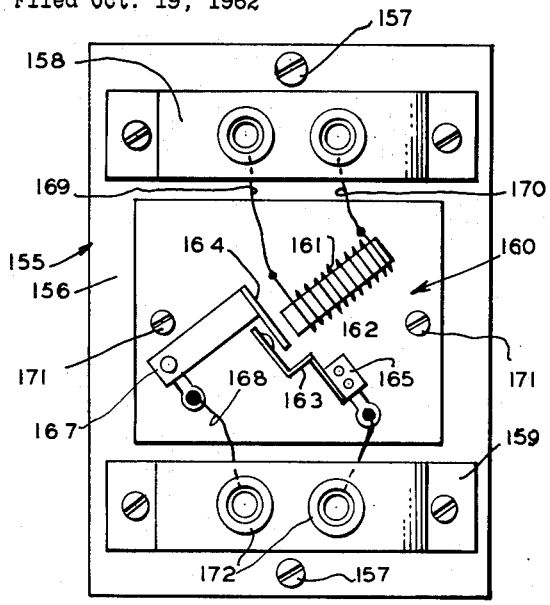
FIGURE 14 is an elevational view of an operational unit for use on the board of FIG. 1, comprising a relay unit, depicting the wiring and interaction of the relay unit.
Figure 16:
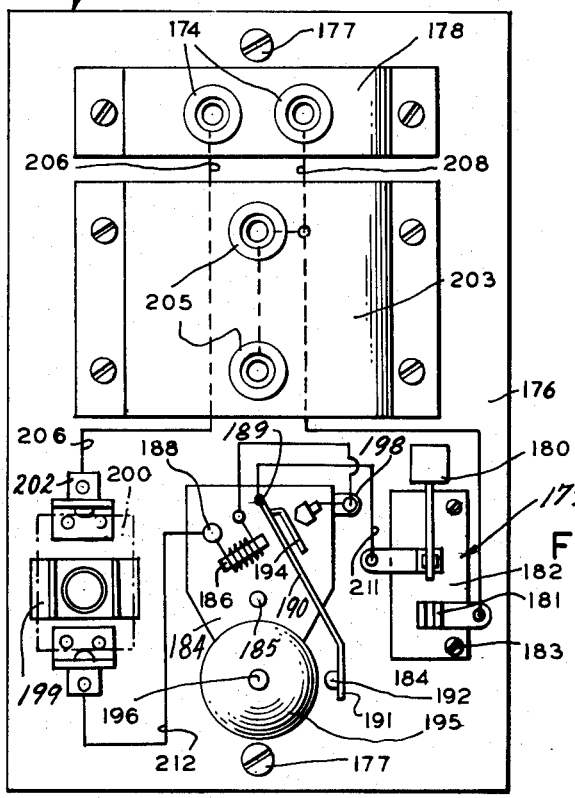
FIGURE 16 is an elevational view of an operational unit for the SUPPLEMENTARY EXPERIMENTAL POSITION, area D of FIG. 1, comprising a bell unit, having its internal wiring thereon, with parts exploded for clarity.

FIGURE 17 is a side view of the bell unit of FIG. 16 with parts in section to show the incorporation of a shunt for a meter to be used therewith, the meter being shown in detached position in an exploded view, for clarity, and FIGURE 18 is a front elevational view of the board of FIG. 1 having assembled thereon the power supply unit of FIG. 3, the main switch unit of FIG. 5, the relay unit of FIG. 14 and the bell unit of FIG. 16, the several units being depicted in simplified form for clarity, and the complete wiring and operation of the system being shown for the demonstration of a relay operated bell similar to the signal system of a conventional telephone.

The above illustrations are exemplary only of the many demonstrations which can be performed with the system of the present invention.

Referring now to FIGS. 1 and 2 of the drawings, there is provided a display board 20 which is mounted for vertical support by a frame 21 and back struts 22 in a conventional manner. If desired, board 20 may be capable of being removed from frame 21 and the frame may be made capable of folding, all for easy transportation. Inasmuch as such features are not germane to the present invention and are conventional for display boards of this general nature, further details relative thereto are unnecessary.

Upon the field presented by upright board 20 held in frame 21, there are inscribed and preferably color-coded, various areas and also there are pre-drilled holes through said board at strategic places for support of certain electrical units, as hereinafter described.

As will be seen from FIG. 1, on the left there is an area heavily outlined with a border 23 for POWER SUPPLY which legend appears in the border as well as the legend "BLACK" which will be the color code then assigned to all units for power supply to be utilized by the system. Power supply area is identified as A. At the four corners of area A and slightly therein there are drilled through board 20 four holes shown at 24, each being surrounded by a black painted border ring 25 for easy observation of position.

At the top center of board 20 is an area B marked with the legend MAIN SWITCH (BROWN), having a heavy identifying border 26 and having two holes through board 20 shown at 27 with border rings 28 there around for easy observation of position. On the righthand side of the field of board 20 there are two areas marked C and D. Area C is identified with the legend EXPERIMENTAL POSITION (GREEN) and has two holes 29 drilled through board 20 which are emphasized by dark border rings 30.

Area D is identified with the legend SUPPLEMENTAL EXPERIMENTAL POSITION (YELLOW) and has two holes 31 drilled through board 20 which are emphasized by dark border rings 32.

Board 20 also has two holes 33 and 34 drilled therethrough in the center field remaining which are identified as PIN X and PIN Y respectively, each bearing the emphasizing ring border as at 35 and 36.

The function of these areas A, B, C and D, and of the holes identified therein, as well as PINS X and Y, will be made apparent later.

The particular form of coding for identification depicted can be varied or changed completely without departing from the function assigned thereto. For example, instead of using a common color for the board with framed areas A, B, C and D coded with the color notation such as (BLACK) and the like, the actual color could be applied to the board in each area in the form of a color swatch or patch.

It is made of particular emphasis at this point that the spacing and layout of all areas on the board and all perforations or holes through the board is such that none of the separate groups are the same. It will be noted that areas A, B, C and D are all different in shape and size and the spacing and positioning of the holes 24, 27, 29 and 31 through the board 20 are completely non-uniform, so that no object provided with protruding pins capable of passing through said perforations and spaced to lie in any one area could be placed in another area successfully. This is an important feature of the present invention.

Referring now to FIGS. 3 and 4, there is illustrated the Power Supply Unit, according to the invention, identified as 40. This unit 40 comprises a board as a base 41 which will be painted black as an overall field to comply with the requirements of area A of FIG. 1. At each of the four corners of the board at spacings to suit holes 24 in area A of FIG. 1, there is arranged a pin comprising a round-headed screw 42 which is passed through a hole 43 in base 40 and is attached in place by a nut 44. A wing nut 45 is placed on screw 42 to permit ultimate positive attachment of base 41 to board 20 by passing screws 42 through holes 24 in board 20 and applying said wing nuts 45.

Power supply unit 40 comprises means to hold a plurality of conventional batteries in various combinations of conditions, namely, series, parallel and series-parallel, together with a control switch and a mounted voltmeter. Since, in this instance, the power supply unit 40 is a most vital unit without which few experiments can be demonstrated, it is preferred that the battery arrangements be alternative and be color-coded upon the black base 41. To this end, there is shown on the right an area for series connection of batteries outlined by a frame 46 which can be painted blue for example. Within frame 46 there are arranged four battery holders 47 of the conventional type used for flashlight batteries. The battery holders 47 in frame 46 are mounted in a vertical array, one above the other in line. Each battery holder 47 has a contact terminal 48 for the positive end, contact bar 49 for the negative end and a body support spring clip 50 for holding the battery in place, all of these being mounted on a support 51 suitably attached in conventional manner (not shown) to base 41. Since such battery holders 47 are conventional, only one has been fully depicted and all other such battery holders 47 on the power supply unit 40 will be of the same form.

On the lower part of base 41 is an area for parallel arrangement of batteries formed by frame 52 which can conveniently be painted white, if desired, and within which is mounted, side by side in a horizontal array, four battery clips 47.

On the lefthand side of base 41 is an area for series-parallel arrangement outlined by frame 53 and code-colored red, if desired, and within which is mounted in an array of two-over-two in both vertical and horizontal alignment, four battery holders 47.

Mounted within the area of frame 53 and frame 46 is a voltmeter 54 calibrated for maximum voltage of four batteries such as 6 volts for standard flashlight batteries, in series, and secured to base 41 by screws 55 passing through flanges 56 and 57 of the voltmeter casing.

Mounted on base 41 above voltmeter 54 is a single pole, single throw knife switch 58 having a switch blade 59, a blade receiving clip 60, a terminal connected to the blade 59 and to a wire 68 and a terminal connected to clip 60.

The internal wiring of the power supply unit 40 is simple as shown in FIG. 3, permitting the alternative use of parallel connection, series connection or a combination thereof through one switch. For the series connected frame 46, the negative battery terminals 49 are connected to positive terminals 48 by wires 63, the uppermost positive terminal 48 is connected to the switch clip terminal 61, by a wire 64 and the lowermost negative terminal 49 is connected by wire 65 to one side of voltmeter 54 at terminal 66. The other terminal 67 of the voltmeter 54 is connected by wire 68 to the terminal for switch blade 59.

If batteries are placed in the series frame 46, when switch 58 is closed, the voltmeter will show their combined voltages, such as about 5 volts D.C. for four fresh flashlight batteries.

The parallel frame 52 is wired with a common lead 69 connecting the negative terminals 49, this lead being in turn connected to wire 65, so that the connection of the parallel batteries on the negative side also goes to terminal 66 of the voltmeter 54. The positive terminals 48 of the parallel array of holders 47 have a common lead 70 which connects with a wire 71 which in turn is connected to terminal 61 of switch 58. If now four batteries are placed in the four holders 47 of the parallel frame 52 and switch 58 is closed, a voltage reading of about 1.25 volts will be obtained.

The series-parallel array in frame 53 is wired by connecting the upper two positive terminals 48 together with lead 72 and tying these into the wire 71 which goes to terminal 61 of switch 58, the negative terminals thereof to the lower positive terminals by wire 73, and the lower negative terminals by wire 74 into wire 69 and thus to terminal 66 of voltmeter 56.. If now four batteries are placed in the series-parallel array of frame 53 and switch 58 is closed a reading will be obtained on the voltmeter between the values of 1.25 and 6 volts D.C. and will approximate 2.5 volts.

It should be realized that with the arrangement illustrated in FIG. 3, the four same batteries can be utilized in different voltage combinations by using them in succession in frames 46, 52 and 53, thus demonstrating, at will, the difference between fundamental arrangements of batteries. Only one frame 46, 52 or 53 can be used at one time, however. It is obvious that all three stations in frames 46, 52 and 53 could be filled with batteries and by using three switches instead of switch 58, the three arrays could be equally compared. However, it is preferred to use the arrangement illustrated in FIG. 3 for the purposes of this invention since the absence of batteries from two out of three positions emphasizes the use of the particular combination or array chosen. To this end, the frames 46, 52 and 53 may be captioned with legends of SERIES, PARALLEL and SERIES-PARALLEL, respectively.

Since the utilization of power supply 40 with other units assembled on board 20 in the positions there indicated is contemplated, an output from unit 40 is provided. To this end, there is provided at the upper end of base 41 an output bar comprising a bracket 75 fastened to base 41. Supported by the main portion of bracket 75 are a pair of sockets 78 which are adapted to receive suitable plugs.

Figure 7:
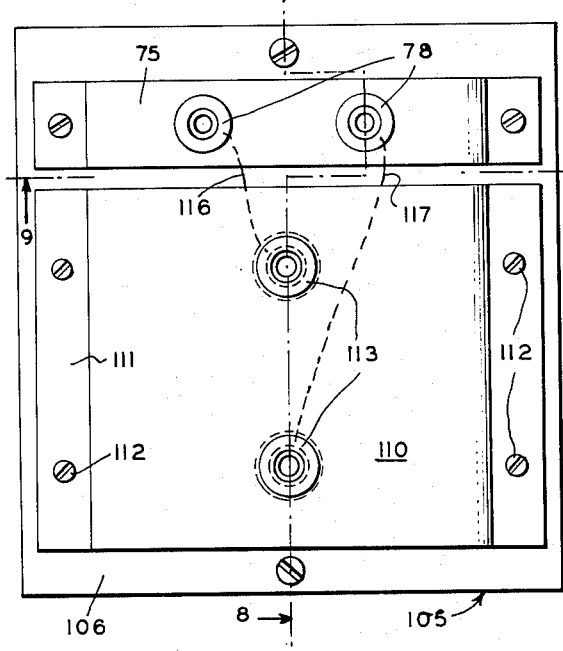
FIGURE 7 is an elevational view of one main auxiliary unit for use with the board of FIG. 1.
Figure 8:
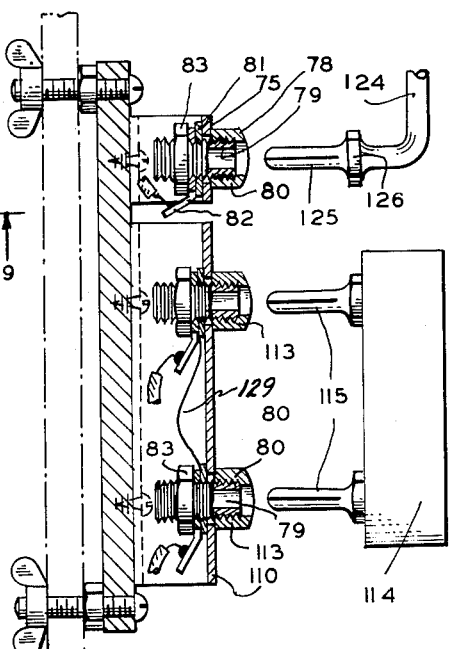
FIGURE 8 is a side view of the auxiliary unit of FIG. 7, with parts shown in section, to illustrate the details of wiring and construction used uniformly through the system according to the invention, the parts of FIG. 8 being exploded to more clearly illustrate the cooperation of the parts depicted.
Figure 9:
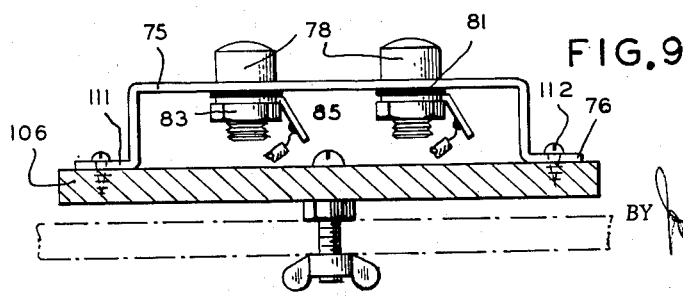
FIGURE 9 is a sectional view along line 9—9 of FIG. 7.

Inasmuch as brackets 75 with sockets 78 are used throughout as common connectors in the present invention, the structure and the use of sockets 78 is best illustrated in FIGS. 7, 8 and 9. Reference will now be made thereto and when brackets 75 and sockets 78 are called for in the description hereof, they will be of the form of FIGS. 7, 8 and 9, as now described specifically. Bracket 75 is formed of aluminum as a channel-shaped member with extending flanges 76, the upper face of the channel being spaced from the base plate and having the two sockets 78 carried to project upwardly therefrom. Screws 112 are used to hold the channel bracket 75 on the base member. Sockets 78 each comprise a hollow pin-receiving tube 79 having an external thread, an insulating cap 80 which screws thereon outside the bracket 75, an insulating washer 81 inside the bracket 75, a terminal lug 82 and a hexagonal nut 83 for completing the assembly, as shown in FIG. 8.

The structure of bracket 75 with sockets 78 just described will be used throughout for connections to be made between various units in order that a minimum of different sizes of connections will be provided but the spacing of the sockets 78 on brackets 75 and the location of brackets 75 on the respective bases will be so varied and arranged that incorrect wiring of units together will be impossible. This will be hereinafter brought forth.

The rest of the apparatus of FIGS. 7, 8 and 9 will be described later, in its sequence.

Returning to FIG. 3, the specific connections for sockets 78 are as follows: one socket 78 by wire 74 to terminal 66 of voltmeter 54 and the other socket 78 by wire to the terminal 61 of switch 58. Thus, when batteries are in place in either frame 46, 52 or 53 and switch 58 is closed, the voltage shown on voltmeter 54 will be available across sockets 78.

Because of the specific wiring, if switch 58 is now opened, the voltmeter 54 will be disconnected, with a resultant reduction of drain on the battery, but the voltage will still be available across sockets 78. Removal of the batteries from their clips is the only way to disconnect the voltage. Thus, when no batteries occupy Power Supply Unit 40, no direct current is flowing, and this is clearly demonstrated.

Figure 6:
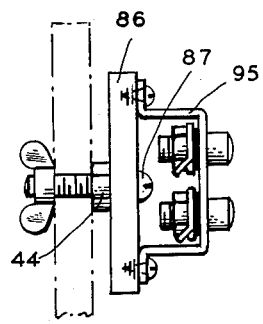
FIGURE 6 is a side view of the main switch of FIG. 5.

Reference will now be made to FIGS. 5 and 6 which show the main switch unit for use in the present invention. In many electrical science demonstrations, it is extremely helpful if the polarity of the battery supply can be reversed, showing the basic change of effect, if any, of reverse flow of E.M.F. through a device. To this end, there is provided a main switch unit, generally shown at 85 comprising a base 86 having two mounting pins therein comprising round-headed screws 87 held in place by nuts 88 and protruding backwardly as shown. Wing nuts 89 on said screws serve to hold the base 86 on board 20 by passing screws 87 through holes 27 and applying the wing nuts 89. The switch element for base 86 is a double throw-double pole switch for use for reversal of current flow of conventional design and wiring. The two bladed switch arm 90 pivots on terminal connectors 91 and can make contact with a pair of clips 92 on the left and a pair of clips 93 on the right all being mounted on a switch plate 94, suitably fastened to base 86. At the extreme left of base 86 there is mounted on input strip 95 comprising a bracket 75 and two spaced twin sockets 75 as shown in FIGS. 7, 8 and 9.

At the righthand side of the base 86 is an output strip 96 also formed of a bracket 75 and twin sockets 78, as shown in FIGS. 7, 8 and 9. The wiring of the main switch unit 86 is conventional to permit reversal of a direct current fed to input terminal strip 95. Input strip sockets 78 are wired to the center pivot terminals 91 by leads 97 and 98, respectively. Output strip sockets 78 are wired to the righthand clip contacts 93 which are near them by means of leads 99 and 100. Common leads to permit reversal of current are identified as wires 101 and 102 and connect "across the board" between clip contacts 92 and 93, to reverse polarity. Whatever the arrangement of polarity of sockets 78 on input strip 95, by putting blades 90 in either of the two contact positions with clip contacts 92 or 93, the output polarity of sockets 78 in output strip 96 will be reversed.

There has thus been provided an output control which can be used with the power supply when connected. Base 86 will be painted BROWN.

Referring again to FIGS. 7, 8 and 9, there is shown a first unit for use in the space (area C) on the board of FIG. 1 marked EXPERIMENTAL POSITION. Unit 105 is an auxiliary meter device so formed that any suitable meter, such as an ammeter, can be placed in circuit with the powers upply unit 40 and the main switch unit 85. In unit 105, there is provided a base 106 which carries two pins, as screws fastened by nuts and bearing wing nuts, for association with holes 30 of area C in FIG. 1 in a manner previously described, to hold unit 105 on board 20. The size of base 106 and its color, which will be green, are common with all units to be used in area C, viz, the EXPERIMENTAL POSITION. In like manner, there is arranged on the upper end of base 106 a bracket 75 having sockets 78, the form and arrangement thereof having been previously specifically described, and bracket 75 is located in each case for a unit for area C at the same location on the base of the unit whereby sockets 78 always occupy the same position on board 20 whatever unit may occupy area C.

Base 106 also carries a metal meter support 110 having flanges 111 which are screwed at 112 to base 106 to hold meter support 110 permanently in place. Carried by the face of support 110 are twin sockets 113, the form thereof being the same as of sockets 78. Sockets 113 are placed vertically aligned and at a distance different to that between sockets 78 to establish a non-uniform connection array. As shown best in FIG. 8, a suitable meter 114, which may be an ammeter, has its internal wiring connected to two protruding pins 115 which are spaced and are matched to the sockets 113, whereby, when desired, meter 114 may be plugged into the circuit of sockets 113 by insertion of pins 115. The sockets 78 of bracket 75 are connected with lead 116 to one socket 113 and by lead 117 to the other socket 113, whereby the ammeter, when plugged in, will be in the circuit leading in from sockets 78.

It is obvious that other meters or indicating devices than ammeter 114, illustrated, can be used by insertion into sockets 113 and alternative units can be made with pins equivalent to pins 115 and spaced at the same distance, whereby other experiments can be performed when the board is connected up, as will now be described.

Referring now to FIG. 10, there is shown the board 20 with the units 40, 85 and 105 assembled and in use, in areas A, B and C. Four flashlight batteries 120 have been placed in position in the series frame 46 of the power supply base 40, meter 54 is registering about 5 volts D.C., with switch 58 closed.

In accordance with an important feature of the present invention, connection between units is made by rigid, preformed connector bars which are so formed as to only be used in the preselected position for the demonstration desired. To this end, referring to FIG. 10, there are provided connectors 121 and 122 which extend from output bar 39 of power supply unit 40 to input bar 95 of main switch unit 85. In like manner, output bar 86 of main switch unit 85 is connected to connector bar 75 of auxiliary meter unit 105 by preformed connected bars 123 and 124. Connector bars 121, 122, 123 and 124 each terminate in plugs or pins which match and conductively connect with the various sockets 78 and are best illustrated in FIGS. 8 and 11. Referring to FIGS. 8 and 11, bar 124 is solid, rigid and strong enough to resist distortion from its preformed shape. The terminal end of each of such bars as 124 comprises a split pin 125 formed integrally with a head 126 having a blind end bore 127 into which the end bar 124 is inserted and soldered in place as at 128.

Connecting bars 121, 122, 123 and 124 are carefully performed, as shown in FIGS. 10 and 11, and are of such length and form that each one can only make connection between the sockets particularly required, i.e. it is not possible to connect units 40, 85 and 105 in any other way than that shown since none of the connector bars 121 to 124 will fit in any other manner than that illustrated. As shown in FIG. 10, with switch 85 open, no current will flow to unit 105. By closing switch 85 in one direction, the ammeter 114 will be energized in one direction, the ammeter 114 will be energized in one direction from its center null position and by closing the switch 85 in the other direction, a similar reading on the ammeter will be obtained in the opposite direction.

Experiments with the four batteries 120 in other positions on power supply base 40 can be run and many fundamentals of electrical science can be demonstrated by this assembly. In place of ammeter 114 may be inserted other demonstration units, such as a neon light, to show other uses of arrangements of batteries in different combinations of circuitry.

Since ammeter 114 can be used for plugging into other units of the system of the present invention, as will be heretofore set forth, in order to accomodate the varying circuits for a single meter, shunts may be incorporated in the individual meter support units and in FIG. 8, at 129, a shunt wire is shown across the terminals of sockets 113 to compensate for the load on ammeter 114. Similar shunts may be used throughout, in accordance with the present invention, to permit accommodation of single units of measurement apparatus for multipurpose uses in the system.

Reference is now made to FIGS. 12 and 13 which illustrate another assembly for demonstrating electrical science, specifically the generation and utilization of electromagnetic forces. In FIG. 12, the board 20 carries the power supply unit 40 and main switch unit 85, as previously described, and these two units are conductively associated by bar connectors 121 and 122 as previously set forth.

The electromagnetic unit is generally indicated at 130 and comprises a base 131, painted green since it will occupy the area C (EXPERIMENTAL POSITION) on board 20. Base 131 will be held onto board 20 by suitable screws 132 through holes 29 in the manner described using lock nuts and wing nuts. At the upper end of base 131 is an input strip 133 having twin sockets 78, the form thereof being as shown in FIG. 8 and the bar connectors 123 and 124 make electrical continuity from output strip 96 of main switch unit 85 to the sockets of strip 133 since the spacing, layout and association on board 20 of unit 130 is the same as unit 105.

Mounted on base 131 is a metal meter supporting bracket having flanges which are fastened to base 131 by screws. In the face of the bracket there are twin sockets 78 which are spaced to receive the pins 115 of ammeter 114, if it is desired to use this meter in the particular tests to be demonstrated. Carried at the lower end of base 131 are a pair of spaced-apart holders 137 for supporting an electromagnet 140, screws being used to fasten brackets 137 to base 131. Electromagnet 140 comprises a soft iron metal core 141 and a winding therearound of wire 142, the ends of wire 142 being taken one each to a terminal of a socket 78 of meter bracket 134 by leads 143 and 144 respectively. The terminals of sockets 78 of meter bracket 134 are in turn connected by leads 145 and leads 146 to the sockets 78 of input strip 133. Accordingly, when main switch 85 is operated, whichever way blade arm 90 is thrown, current will flow through winding 142 in one or the other direction and core 141 will be magnetized. By using the reversing main switch 85, the polarity of the electromagnet 140 can be changed at will. When current is flowing, electromagnet 140 will hold metal objects until the current is cut off. It can be used to deflect a compass needle and generally can demonstrate the electromagnetic theories. By plugging in the ammeter 114, the reversal of current can be identified visually.

Means are provided on the board 20 to permit auxiliary devices to be associated with the basic units occupying areas A, B and C and D when desired. As shown in FIG. 1, holes 33 and 34 are identified as PIN X and PIN Y. With the unit 130, either PIN X or PIN Y can be readily used to demonstrate how like magnetic poles repel and unlike magnetic poles attract. To this end, there is provided a hanger 147 which has a screw which passes through hole 34 of PIN Y and is held in place by a wingnut. Hanger 147 has a protruding rod 150 which projects forwardly from board 20 for a distance. Suspended by a suitable line 151 tied to rod 150 is a semicircular holder 152 into which is clipped a permanent bar magnet 153, the arrangement being such that the magnet 153 can rotate freely on the line 151. A pole of magnet 153 can be closely associated with a pole of electromagnet by alignment of line 151 on rod 150 and magnet 153 in holder 152 as shown in FIG. 12, with the main switch 85 in open position. Now, if main switch 85 is closed, the permanent magnet 153 will be either attracted or repelled by the electromagnet 140 and this condition can be selected, at will, and can be observed on ammeter 114, if same is used, in order to show reversal of current causes reversal of polarity of the electromagnet 140. This is only one of many experiments which can be carried out with the board 20 assembled as in FIG. 12.

Figure 15:
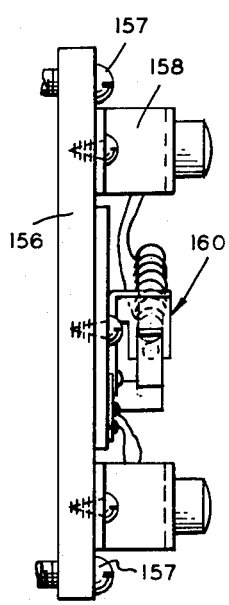
FIGURE 15 is a side view of the relay unit of FIG. 14.

As shown in FIG. 1, there is a further area D defined on the board 20 for a SUPPLEMENTAL EXPERIMENTAL POSITION. Its dimensions, arrangemen of holes 31 and color (YELLOW) are all different from areas A, B or C in order that only those units to be so utilized can be assembled in position in area D. One of such units will now be described. Reference is made to FIGS. 14, 15 and 16 of the drawings. In FIGS. 14 and 15, two units are shown which can be used separately together as desired in areas C and D. A unit for use as an electrical relay is shown generally at 155.

Relay unit 155 will be applied to board 20 in area C and can be used for its specific function alone in that position. It comprises a base 156, which will be painted green for use in area C, attached to board 20 through holes 29 by screws 157 having the previously described locknuts and wingnuts. Mounted upon base 156 at the upper part is an input strip 158 identical in form, position and construction as input strip 133 of FIG. 12 and bearing twin sockets 78 similar to those shown in FIG. 8.

Mounted on base 156 is an output strip 159 identical also in form and construction to strip 75 bearing twin sockets 172 as shown in FIGS. 7 and 8.

Situated generally centrally of base 156 is a relay 160 of conventional form having an actuating coil 161, an armature 162, a spring contact 163 and another contact 164, which form a make-and-break action when coil 161 is energized. The spring contact 163 is connected through terminal block 165 by a lead 166 to one socket of output strip 159 and spring terminal 164 is connected through terminal block 167 by lead 168 to the other socket of output strip 159. The windings of coil 161 are connected by leads 169 and 170 to the two sockets of input strip 158. Relay 160 is suitably held to base 156 by screws 171. If a source of E.M.F. is now connected to input strip 158 through its sockets, the coil 161 will be energized and will hold armature 162 until the current is broken so that contacts 163 and 164 will be held together and thus the sockets of output strip 159 will be shorted.

As shown in FIG. 18, relay unit 155 can be assembled on board 20 in area C, together with the Power Supply Unit 40 and main switch 85 and by use of the same connecting bars 121, 122 123 and 124 as before, (see FIG. 10) power can be supplied to input strip 158 from the batteries shown on base 40 by closing switch arm 90. A distinct clicking can be made with relay 160 by closing and opening switch 85, manipulation of switch arm 90 in either direction causing this action, thus showing that polarity has no effect on the relay. The relay when thus operated at a fast make-and-break of switch 85 resembles and exemplifies a telegraph key operation. In order to obtain the best results for this experiment, the four batteries are used in the series frame 46 of base 40, as better shown in FIG. 10, since this gives greatest voltage and thus the loudest and fastest contact of the armature 162 under urge of coil 161. However, operation of the relay 160 at different noise levels can be shown with batteries in all positions on board 20. To show that relay 160 will hold in contact position as long as coil 161 is energized, the switch 85 can be left closed. To demonstrate how little power is needed for this purpose, the four batteries should be placed in parallel, as shown in FIG. 18, in frame 52 on board 40, and thereafter these can be removed one by one until it is shown that only a single flashlight battery can hold the relay closed for a long period of time.

Reference is now made to FIGS. 16 and 17 of the drawings which illustrate the Bell Unit, identified as 175 and which is to be used in the SUPPLEMENTAL EXPERIMENTAL POSITION, area D of board 20. Bell unit 175 is formed of a base 176 which will be painted yellow and will be of a size to occupy area D on board 20. Two screws 177 having locknuts and wingnuts as previously described (FIG. 6) are used to mount base 176 through holes 31 of board 20, thus establishing the position of the Bell unit 175 with the rest of the apparatus for the system. Mounted at the upper end of base 176 is an input strip 178 formed exactly as previously described in FIG. 8 and having twin sockets 174 thereon. Mounted on the right hand side of the base 176 is a knife switch 179 which is a single pole single throw switch having a blade 180, contacts 181 and a base 182 suitably attached by screws 183 to base 176. Below switch 179 is mounted a conventional electromagnetic bell 184 by screws 185. Bell unit 184 has an electromagnet 186 with windings 187 attached to terminals 188 and 189. An armature 190 having an extending rod 191 terminating in a striker 192 is held at 193 and carries a spring contact 194. A bell 195 is supported to resonate on base 176 on a pin 196. A make-and-break contact 197 is mounted behind spring contact 194 and has a terminal 198 therefor. A battery holder or clip 199 is suitably mounted to base 176 and holds a flashlight battery 200 in position and has negative terminal 201 and positive terminals 202. Above battery holder 199 is arranged a meter holding frame 203 held to base 176 by screws having two sockets 205 therein spaced and located to receive ammeter 114, in which connection reference is made to FIGS. 7 and 8 showing a similar meter-holding frame 111 for said ammeter. The construction, arrangement and proportions of meter holder 203 are identical with holder 111 so that the same meter can be used in each application in the system. A suitable shunt wire is connected between the terminals of sockets 205 in order to compensate for parallel battery load which will be used in order to obtain a positive movement of the meter 114, to show reversal of polarity.

Wiring for the Bell Unit 175 is as follows:

From the positive battery terminal 202 of clip 199, a lead 206 connects with one socket 205 of meter holder 203 by a lead 207 and then to one socket 174 of input strip 178. The other socket 174 of input strip 178 connects by lead 208 to a wire which is connected to the other socket 205 of meter holder 203, and by wire to the terminal lug of the contact clip 181 of SPST switch 179. The center terminal for switch arm 180 of switch 179 is connected by lead 211 to terminal pivot 193 of bell striker rod 191. The negative terminal 201 of battery clip 199 connects by lead 212 to the first terminal 188 of the windings 187 of electromagnet 186. The other terminal of winding 187 connects by a lead to the terminal lug 198 for the make-and-break contact 197.

With this circuit, the meter sockets 205 are in parallel circuit to be used whenever a meter is desired. The circuit is, however, open since the positive side of battery 200 is broken by leads 206 and 208 connecting to sockets 174 of input strip 178. In order to cause bell 184 to ring, it is necessary to complete this circuit and there is provided, for this demonstration, a metal shorting bar 214 which has two pins 215 which are spaced to engage in sockets 174 thereby completing the internal circuit of Bell Unit 175. By closing switch 179 the bell will ring with the shorting bar 214 in place and will continue to ring using its own internal battery 200. Bell Unit 175 may be placed on board 20 and demonstrated for its own use, as an example of a doorbell or of a telephone bell.

It is desired, however, to combine Relay Unit 155 and Bell Unit 175 so that the relay will control the bell circuit entirely. This simulates the relay operation of a telephone bell for example. To this end, the arrangement shown in FIG. 18 is used. As previously described, Power Supply Unit 40 is in place with batteries 217 arranged in frame 52, parallel connection and Relay Unit 155 is assembled on the board 20. Bell Unit 175 is attached to board 20 by pins 177. A pair of connector bars 216, similar to those previously described as at 124, FIG. 8, connect the sockets 172 of output strip 159 of Relay Unit 155 with the sockets 174 of input strip 178 of Bell Unit 175. If now main switch 85 is closed, in either direction of current flow, relay 160 will close and remain closed until switch 85 is opened. This will complete the bell circuit so that by closing switch 179, the bell will ring. If the relay 160 is opened by opening switch 85 the bell will stop. This demonstrates relay control of Bell Unit 175. The ammeter 114 is shown inserted in holder 203 and by this means, the fact that polarity has no effect on the relay-bell control circuits can be shown, using the reversal of polarity which can be obtained by switching main switch 85 to its alternative positions.

Modifications in the system hereinbefore described are obvious. The type of units to fill areas C and D for experiments are many and can embrace electromagnetic, electrostatic and electromotive devices, as well as light units. The basic concept of a system, as claimed, which will permit of demonstration of electrical science experiments utilizing separate units which can be quickly assembled and associated but which can only be connected in one way is unique, useful and an improvement in the art, particularly to serve educators as well as to form a self-educating game for students of the electrical sciences. While the Power Supply Unit 40 has been described as of direct current source only, using clipped in flashlight batteries, it is obvious that this vital unit could be replaced either by other forms of wet or dry cell batteries or by a source of alternating current such as a transformer having a tapped secondary winding or a variable voltage transformer of conventional design. It is obvious that the type of units utilized for the system can vary widely and still fall within the spirit and scope of the appended claims.

What is claimed is:

1. In a system of the character described, the combination which comprises:
  (1) a base panel bearing plural sets of perforations arranged in a pattern to provide reception and unique positional support for each of a plurality of individually unique, non-interchangeable demonstration units as named hereinafter,
  (2) a battery power unit mountable in one set of such perforations, said unit including an output strip with two terminal sockets and having plural and different battery holding means arranged so as to supply selectively different voltages to said terminal sockets,
  (3) a main switch unit mountable in another set of such perforations, and including an input strip with a pair of terminal sockets, an output strip with a pair of terminal sockets, and polarity reversing means between said respective pairs of sockets,
  (4) a main experimental unit mountable in still another set of such perforations and including an input strip with a pair of terminal sockets and an electrical phenomenon demonstration device, and
  (5) plural sets of rigid connecting bars of respective lengths appropriate for connecting respectively and uniquely the power unit output to the main switch input and the main switch output to the main experimental unit input, the arrangement being such that no alternative connections can be made inadvertently.

2. Combination according to claim 1 wherein an additional supplementary experimental unit and mounting means therefor on said base panel are provided.

3. The system in accordance with claim 1 wherein said battery power supply unit comprises a group of battery clips connected in parallel, a group of battery clips connected in series, a group of battery clips connected in series-parallel, the positive and negative terminals of each group connecting to a pair of sockets on said outlet strip, to permit of alternative use only, a voltmeter and a switch in series therewith, said voltmeter and switch being connected across said sockets to permit direct current voltage reading in any group when batteries are placed within said battery clips.

4. The system according to claim 1 having an electromagnet with a core and an energizing coil connected to said main switch unit and means to freely suspend a permanent magnet from a support on said board, permitting rotation of said magnet relative to its support, said permanent magnet being aligned with the poles of said magnet in close proximity to the core of said electromagnet, whereby rotation of said magnet by said electromagnet can be obtained by repeated reversing of said main switch.

References Cited by the Examiner

UNITED STATES PATENTS

| | | | |
|---|---|---|---|
| D. 176,574 | 1/56 | Tucker | 35—19.1 |
| 1,271,641 | 7/18 | Werwath | 35—19.1 |
| 2,826,628 | 3/58 | Kruse | 35—19.1 X |
| 2,859,540 | 11/58 | Himpele | 35—19.1 |
| 3,078,596 | 2/63 | Sweeton | 35—19.1 |

FOREIGN PATENTS

| | | |
|---|---|---|
| 932,375 | 11/47 | France. |
| 1,012,846 | 4/52 | France. |

JEROME SCHNALL, *Primary Examiner.*